Patented Jan. 2, 1951

2,536,136

UNITED STATES PATENT OFFICE 2,536,136

MOLDED FRICTION LININGS

David E. Lucid, Dayton, Ohio, assignor to General Motors Corporation, Detroit, Mich., a corporation of Delaware No Drawing. Application January 10, 1947,
Serial No. 721,487

3 Claims. (Cl. 260—19)

This invention relates to an improved binder for moldable friction compounds such as are especially suitable for making brake linings and clutch facings for automotive vehicles.

An object of this invention is to provide a moldable friction compound having an improved binder which will provide molded friction linings having little fading and uniformly stable recovery characteristics under wide variations in temperature, such as will be especially suitable for use as brake linings and clutch facings for automotive vehicles.

Another object is to provide molded friction linings having a combination of thermosetting binders therein comprising an oil-modified thermosetting resin and an oil-soluble synthetic rubber, said two binders being relatively proportioned to each other to provide a series of friction linings having uniform fading and subsequent recovery characteristics as substantially predetermined by said relative proportions.

My prior Patent No. 2,379,166, filed November 4, 1943, issued June 26, 1945, defines oil-modified thermosetting resins and discloses molded friction linings having as binder an oil-modified thermosetting resin. When such an oil-modified thermosetting resin is used the resulting friction lining has good friction and wearing qualities but in many cases has another characteristic which is not desired for use as brake linings for automotive vehicles. Said undesired characteristic is a tendency of the brake lining to "over-recover" its friction coefficient upon cooling off after being heated to the higher temperatures under rigorous braking conditions, as may occur for instance when coming down a steep hill or long mountain. The coefficient of friction of present day brake linings decreases somewhat in value or "fades" as the linings heat up and upon subsequent cooling off increases again or "recovers." The driver of the vehicle will readily get used to a gradual uniform fading and uniform non-erratic recovery of his brakes and so will automatically make allowances therefor when applying the brakes. But present-day brakes often "over-recover" upon cooling by the coefficient of friction quickly rising to a higher value than originally, and often recover erratically by rising to around its original value in a non-uniform or erratic manner. Erratic recovery means a varying recovery from time to time, which in turn means that the four brakes on the four wheels will most likely recover differently upon any one application of the brakes. Either "over-recovery" or any sort of erratic recovery is most likely to catch the driver by surprise when he next applies the brakes. Any such over-recovery or erratic variation in the braking coefficient is naturally confusing to the driver and obviously seriously affects safe driving.

Now one object of this invention is to provide friction linings which have predetermined fading characteristics and non-erratic recovery characteristics upon rapid cooling after being heated up.

Another object is to provide friction linings whose friction coefficient will vary in the expected predetermined manner with changes in temperature and so eliminate over-recovery and other erratic variations when applying the brakes.

Another object of this invention is to provide a friction lining compound having both an oil-modified thermosetting resin and synthetic rubber serving as binders therein, the relative amounts of thermosetting resin and synthetic rubber being so proportioned in the compound as to give a final friction lining having predetermined characteristics of fading and recovery under temperature changes.

By using various selected relative amounts of the oil-modified thermosetting resin and synthetic rubber as the binder in the friction compound the fading and recovery qualities of the final friction lining may be predetermined over a wide range. As an example, a friction compound using 11 parts by weight of oil-modified thermosetting resin "solids" to 5 parts by weight of synthetic rubber "solids" as the binder will result in a friction lining having only a small degree of fading under temperature rise and also a very good uniform recovery upon cooling. Now if a still more stable and uniform recovery is desired in the final lining this can be obtained—but at the expense of some increase in fading—simply by decreasing the ratio of said "resin solids" to said "rubber solids" to say 8 parts each binder. But if even less fading is desired the ratio of 14 parts by weight of resin "solids" to 2 parts by weight of synthetic rubber "solids" may be used. Ratios intermediate of those in the above examples will give intermediate predictable results. Thus the fading and uniform and stable recovery characteristics of the friction lining may be simply varied over quite a wide range in order to give various desired braking characteristics for automotive vehicles.

Another feature of the friction compound of this invention is its greater physical strength due to the binder used. Another feature is its high degree of extrudability which permits it to be very readily extruded thru an extrusion aperture into a smooth pliant slab having greater strength in its uncured state and whose width and thickness is determined as desired by the dimensions of the extrusion aperture. This greatly facilitates and lessens the cost of manufacture of brake linings suitable for automotive vehicles.

Additional advantages of this invention will appear hereinafter from the detailed description thereof.

As a specific illustration of practising this invention, I will now give a description of an illustrative friction compound formula and suitable methods used therewith for making a friction lining suitable for brake linings or clutch facings for automotive vehicles.

Compound "A"

|   | Pounds |
|---|---|
| 1. Short asbestos fiber | 71.00 |
| 2. Gilsonite (in powder form) | 2.00 |
| 3. Heat-resisting friction powder derived from cashew liquid | 8.00 |
| 4. Barytes (in powder form) | 5.00 |
| 5. Sulphur (in powder form) | 2.50 |
| 6. Zinc oxide (accelerator) | .25 |
| 7. Hexamethylene-tetramine | 1.00 |
| 8. Synthetic rubber cement (of oil soluble type) (containing 15% "solids") | 40.00 |
| 9. Oil-modified thermosetting resin liquid (containing 75% "solids") | 18.00 |
|   | 147.75 |

The synthetic rubber cement (item 8 in above formula) comprises an oil-soluble type of synthetic rubber, such as a copolymer of Butadiene and Styrene often called Buna-S (known during the world-war as G R S) or a copolymer of isoprene and isobutylene called Butyl Rubber, dissolved in sufficient petroleum naptha (or gasoline) to provide about 15% by weight of synthetic rubber "solids" in the solution. Thus the 40 lbs. of item 8 in the above formula will contain 15% of "solids," i. e. 6 lbs. of "synthetic rubber solids" and 34 lbs. of naptha solvent.

The oil-modified thermosetting resin solution (item 9 in above formula) contains 75% of so-called "solids" dissolved in the remaining percentage of benzol, alcohol, toluol, or other suitable solvent. These "solids" in turn are composed of about 40% of a suitable thermosetting resin (such as phenol-formaldehyde resin) and about 60% of modifying oils to form a very viscous liquid known as "oil-modified synthetic resin." The modifying oils used may suitably be blown linseed oil, castor oil, China-wood oil, oiticica oil or various combinations of these oils to comprise in the aggregate about 60% of the so-called "solids." As an example, the 18 lbs. of oil-modified resin liquid specified in "Compound A" will contain 75% of "solids," i. e. 13.5 lbs. of "oil-modified resin solids" and 4.5 lbs. of benzol or other suitable solvent therefor. This 13.5 lbs. "solids" comprises about 40% resin, i. e. 5.4 lbs. resin and 8.1 lbs. of modifying oils. Hence "Compound A" has a ratio of 13.5 parts by wt. of "oil-modified resin solids" to 6 parts by wt. of "synthetic rubber solids."

One optional method of mixing the above compound will now be described.

*Step #1.*—Mix the asbestos fiber and the finely divided dry ingredients of the compound (items 1 to 7 in above "Compound A") in a suitable mixing machine which will fluff the asbestos fiber and thoroly mix it with the other dry ingredients until a substantially homogeneous dry mix is provided.

*Step #2.*—Place this dry mix in a dough mixer (or similar mixer) and add the synthetic rubber cement (item 8) and mix for about two to five minutes, or until a quite homogeneous mixture is formed.

*Step #3.*—Then add the oil-modified thermosetting resin liquid (item 9) to the already mixed synthetic rubber and other ingredients therein, and mix for 8 to 10 minutes or until the viscous liquid oil-modified resin is thoroly dispersed in and incorporated with the synthetic rubber cement to form a binder for the asbestos fiber and the other finely divided filler ingredients in the mix. This results in a homogeneous plastic mass which may be readily extruded thru an extruding die aperture to the desired cross section by means of an extruder of the screw or ram type.

Another optional method of mixing the above compound is as follows:

*Step #1.*—A dry mix of the fiber and other dry ingredients is formed as given in step #1 outlined above.

*Step #2.*—Pour the synthetic rubber cement (item 8 of above formula) in a dough mixer and add thereto the viscous liquid oil-modified thermosetting resin (item 9) and mix for about 2 to 5 minutes to thoroly mix these two viscous liquid binder ingredients.

*Step #3.*—Then to this binder in the dough mixer add the already mixed fiber and other dry ingredients and mix for a period of about 8 to 10 minutes to form a readily extrudable homogeneous tacky plastic mass.

The plastic compound, made by either of the above methods of mixing same, is placed into the extruding machine and extruded thru an apertured die into a continuous pliant slab whose width and thickness is accurately determined by the corresponding dimension of the aperture in the extrusion die. Preferably the continuous slab, as it passes from the extrusion die, is cut off into convenient lengths to facilitate handling and laid upon perforated metal plates and air dried at room temperature about 2 to 6 hours. Then said slabs are removed to a drying oven in order to completely evaporate the volatile solvents therefrom. The drying oven temperature should not be so high as to cause any setting up of the synthetic rubber or the thermosetting resin in the compound at this stage, and preferably should be within the distillation range of the petroleum naptha used in item 8, for instance about 150° F. Such oven drying should be done slowly and may take from 8 to 16 hours.

These dried slabs come from the drying oven as quite strong self-retaining boards which can be readily handled without breaking same. Hence such dried slabs (or any other similarly extruded sections) are well adapted for use as preforms for subsequent molding under heat and pressure by any suitable well-known molding method.

For making automotive brake linings from such dried slabs the following is given as an illustrative example: A dried slab is inserted between two preferably unheated platens of a molding press and the press closed thereupon at a pressure of about 1075 lbs. per sq. in. upon the slab for a short time, say one-half minute, in order to highly compact and increase the density of the slab without causing any setting up of the resin therein. Or the slab may be run through cold rolls to compact and increase its density. The slab is then inserted between two hot platens (about 300° F.) of a molding press and molded at a pressure upon the material of about 235 lbs. per sq. in. for a five minute period, followed by increasing the molding pressure to about 1075 lbs. per sq. in. for an additional five minutes or for such time period as may be required to permanently compact and cure both the thermosetting resin and the synthetic rubber content to the desired predetermined degree of hardness and rigidity. This predetermined degree of cure should not be a complete cure and should leave these slabs somewhat flexible. This degree of partial cure may be accurately controlled by quick cooling after the predetermined time period of hot cure, which quick cooling is obtained by running cold water thru the press platens. The partially cured slabs are then removed from the press and thereafter cut into straight flat pieces having the desired length and width to form the individual brake linings. Preferably these pieces are ground down to the desired final thickness while still in this flat form.

These straight flat pieces are later preferably warmed for a period of one-half to 5 minutes at about 250° F. to 300° F. to render them more flexible, and then bent to final correct arcuate form desired in the final brake linings by tightly clamping them in suitable portable baking forms. These baking forms retain the individual linings tightly clamped in correct arcuate form between curved metal surfaces all during their final curing period, which may be from 2 to 6 hours at a curing temperature of from 300° to 450° F. A typical final cure is 3 hours at about 400° F. This relatively slow final cure may be efficiently done in a baking oven. Thereafter the finally cured linings are preferably allowed to cool to around room temperature while still retained tightly clamped in the portable baking forms. This provides more uniform cooling and causes the linings to accurately retain their correct shape upon removal from their baking forms.

Other specific illustrative examples of friction compound formulas according to this invention are as follows:

*Compound "B"*

| | Pounds |
|---|---|
| 1. Short asbestos fiber | 64.0 |
| 2. Heat-resisting friction powder derived from cashew liquid | 9.0 |
| 3. Barytes (in powder form) | 6.0 |
| 4. Sulfur (in powder form) | 2.5 |
| 5. Zinc oxide | 0.25 |
| 6. Hexa-methylene-tetramine | 1.08 |
| 7. Synthetic rubber cement (of oil soluble type) (containing 15% "solids") | 33.35 |
| 8. Oil-modified thermosetting resin liquid (containing 70% "solids") | 14.60 |
| | 130.78 |

*Compound "C"*

| | Pounds |
|---|---|
| 1. Short asbestos fiber | 64.0 |
| 2. Graphite (in powder form) | 9.0 |
| 3. Barytes (in powder form) | 7.0 |
| 4. Sulfur (in powder form) | 2.5 |
| 5. Zinc oxide | 0.25 |
| 6. Hexa-methylene-tetramine | 1.08 |
| 7. Synthetic rubber cement (of oil soluble type) (containing 15% "solids") | 33.35 |
| 8. Oil-modified thermosetting resin liquid (containing 70% "solids") | 14.60 |
| | 131.78 |

Compounds B and C contain 15% of 33.35 lbs. or 5 lbs. of "synthetic rubber solids"; and contain 70% of 14.6 lbs. or 10.22 lbs. of "oil-modified resin solids." Hence the ratio of "resin solids" to "synthetic rubber solids" is 10.22 to 5 in both B and C compounds.

Compounds "B" and "C" may each be mixed by either of the above optional methods for mixing Compound "A." Also Compounds "B" and "C" may be extruded, dried and molded by the methods outlined above for Compound "A," or by any other suitable and known method. The oil-soluble synthetic rubber cement of Compounds A, B, and C is specified as containing 15% "solids" and 85% petroleum naptha or gasoline, however this percentage content of said "solids" is not critical and may suitably vary from say 12% up to 20% of the weight of the rubber cement used in the compound, dependent upon how much naptha is wanted to facilitate the mixing and extrusion of the compound.

Likewise, the percentage content of "solids" in the oil-modified thermosetting resin liquid given in compounds A, B and C is not very critical and may suitably vary from 65% to 80%, the effect of increasing such percentage without changing the total weight of "resin solids" in the compound being, of course, to reduce the total weight of the resin solvent in the compound. In any compound containing insufficient naptha and resin solvent as used in the synthetic rubber cement and resin liquid, respectively, to provide the desired ready mixing and plastic qualities to the compound, this difficulty may be overcome by adding additional naptha to the mix to get the desired plastic tacky mass. Since both the naptha and the resin solvent are evaporated from the compound prior to curing, they form no part of the content of the final friction lining.

The percentages of all the ingredients of Compounds A, B, and C may be varied within reasonable ranges by those skilled in the art to give predictable results according to the teachings of this invention. The sulphur and zinc oxide serve to cure the "synthetic rubber solids" so preferably the amounts of these ingredients vary together. The hexamethylene-tetramine serves to cure the "thermosetting resin solids." According to this invention the relative amounts of the two binders, i. e. the ratio of the "resin solids" to the "synthetic rubber solids," is a most important factor and determines the fading and recovery characteristics of the final friction lining, as outlined herein. In Compound A this ratio is 2.25 to 1 and in Compounds B and C this ratio is 2.04 to 1. In some cases this ratio may advantageously range up to 7 to 1, which will give a friction lining having practically no fading under any normal temperature rise but at the expense of somewhat less uniform recovery characteristics after the maximum temperature rises. In other words, the best balance between the fading and recovery characteristics of the friction lining for any given use can be very simply obtained by changing the ratio of the two binders without changing the aggregate weight thereof. In all such compounds the combination of the two binders has been found to give less erratic variations in the coefficient of friction upon temperature changes than can be obtained with either binder used alone. The presence of only a small percentage of oil-soluble synthetic rubber in an automotive brake lining having a main binder of oil-modified synthetic resin has a highly advantageous and peculiar effect in correcting the otherwise undesirable recovery characteristics thereof.

What is claimed is as follows:

1. A heat cured molded friction element comprising a frictional filler, a main binder of oil-modified phenol-formaldehyde resin solids with individual curing agents therefor, and an auxiliary binder of oil-soluble synthetic rubber solids with individual curing agents therefor, the ratio by weight of said resin solids to rubber solids being from approximately 1 to 1 to 7 to 1.

2. A heat cured molded friction element comprising a frictional filler, a main binder of oil-modified phenol-formaldehyde resin solids with individual curing agents therefor, and an auxiliary binder consisting of oil-soluble copolymers of butadiene-styrene synthetic rubber, the ratio by weight of said resin solids to said rubber solids being from 1 to 1 to 7 to 1.

3. A heat cured molded friction element comprising a frictional filler, a main binder of oil-modified phenol-formaldehyde resin solids with individual curing agents therefor, and an auxiliary binder consisting of oil-soluble copolymers of isoprene isobutylene synthetic rubber, the ratio by weight of said resin solids to said rubber solids being from 1 to 1 to 7 to 1.

DAVID E. LUCID.

REFERENCES CITED

The following references are of record in the file of this patent:

UNITED STATES PATENTS

| Number | Name | Date |
| --- | --- | --- |
| 2,114,121 | Bender | Apr. 12, 1938 |
| 2,369,583 | Lucid | Feb. 13, 1945 |